US012791388B2

(12) United States Patent
Yang et al.

(10) Patent No.: US 12,791,388 B2
(45) Date of Patent: Nov. 10, 2026

(54) COLORIMETER AND CONTROL METHOD THEREOF

(71) Applicant: CHAMP VISION DISPLAY INC., Miao-Li County (TW)

(72) Inventors: Chiao-Chih Yang, Miao-Li County (TW); Han-Jen Pai, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 140 days.

(21) Appl. No.: 19/047,660

(22) Filed: Feb. 7, 2025

(65) Prior Publication Data

US 2025/0264361 A1 Aug. 21, 2025

(30) Foreign Application Priority Data

Feb. 16, 2024 (TW) ................................ 113105558

(51) Int. Cl.
*G01J 3/50* (2006.01)
*G01J 3/02* (2006.01)

(52) U.S. Cl.
CPC ............... *G01J 3/506* (2013.01); *G01J 3/021* (2013.01); *G01J 3/0297* (2013.01)

(58) Field of Classification Search
CPC ........... G01J 3/506; G01J 3/021; G01J 3/0297
See application file for complete search history.

(56) References Cited

U.S. PATENT DOCUMENTS

| | | | |
|---|---|---|---|
| 10,044,910 B2 | 8/2018 | Ogasawara | |
| 2020/0016903 A1 | 1/2020 | Harayama et al. | |
| 2021/0215538 A1* | 7/2021 | Chen | G01J 3/0202 |
| 2023/0342091 A1 | 10/2023 | Wushour | |

FOREIGN PATENT DOCUMENTS

| | | |
|---|---|---|
| TW | 201337906 | 9/2013 |
| TW | 201437615 | 10/2014 |
| TW | 202207188 | 2/2022 |
| TW | 202337196 | 9/2023 |

* cited by examiner

*Primary Examiner* — Georgia Y Epps
*Assistant Examiner* — Don J Williams
(74) *Attorney, Agent, or Firm* — JCIPRNET

(57) ABSTRACT

A colorimeter and a control method thereof are provided. The control method includes: performing a first calibration function, wherein the first calibration function includes: providing a first light beam from a light source, wherein the first light beam corresponds to a first reference value; detecting the first light beam via a color sensor to generate a first measurement value; and generating first calibration information according to the first measurement value and the first reference value; and performing a second calibration function, wherein the second calibration function includes: detecting an external light beam via the color sensor to generate optical data; and calibrating the optical data according to the first calibration information and outputting the calibrated optical data.

18 Claims, 3 Drawing Sheets

COLORIMETER AND CONTROL METHOD THEREOF

CROSS-REFERENCE TO RELATED APPLICATION

This application claims the priority benefit of Taiwan application serial no. 113105558, filed on Feb. 16, 2024. The entirety of the above-mentioned patent application is hereby incorporated by reference herein and made a part of this specification.

BACKGROUND

Technical Field

The disclosure relates to a color measurement technology, and particularly relates to a colorimeter and a control method thereof.

Description of Related Art

A colorimeter can be used to measure a color of an image displayed by a display device, and calibrate the display device based on a measurement result. Optical components and electrical properties of the traditional colorimeters vary with temperature or time. To maintain an accuracy of a measurement of the colorimeter, it is necessary for a user to regularly ask professionals to calibrate the colorimeter using calibration software. Therefore, the user needs to spend high personnel costs to calibrate the colorimeter. In addition, the calibration of the colorimeter needs to rely on a colorimeter with higher accuracy. Without a higher-level colorimeter, color correction will be difficult to implement. Furthermore, the calibration software of the colorimeter needs to be executed by a computer, so the user also needs to prepare a computer to perform color calibration.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

To achieve one or a part or all of the above or other purposes, a colorimeter according to an embodiment of the disclosure includes a casing and a color sensor, a storage medium, a light source, and a processor disposed in the casing. The processor is coupled to the color sensor, the storage medium, and the light source, wherein the storage medium stores a first reference value, and the processor is configured to perform a first calibration function. The first calibration function includes: providing a first light beam from the light source, wherein the first light beam corresponds to the first reference value; detecting the first light beam via the color sensor to generate a first measurement value; and generating first calibration information according to the first measurement value and the first reference value. The processor is configured to perform a second calibration function, wherein the second calibration function includes: detecting an external light beam via the color sensor to generate optical data; and calibrating the optical data according to the first calibration information, and outputting the calibrated optical data.

To achieve one or a part or all of the above or other purposes, an embodiment of the disclosure includes a control method of a colorimeter. The colorimeter includes a casing and a color sensor, and a light source disposed in the casing. The control method includes: performing a first calibration function, wherein the first calibration function includes: providing a first light beam from the light source, wherein the first light beam corresponds to a first reference value; detecting the first light beam via the color sensor to generate a first measurement value; and generating first calibration information according to the first measurement value and the first reference value; and performing a second calibration function, wherein the second calibration function includes: detecting an external light beam via the color sensor to generate optical data; and calibrating the optical data according to the first calibration information, and outputting the calibrated optical data.

Other objectives, features and advantages of the disclosure will be further understood from the further technological features disclosed by the embodiments of the disclosure where there are shown and described preferred embodiments of this disclosure, simply by way of illustration of modes best suited to carry out the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
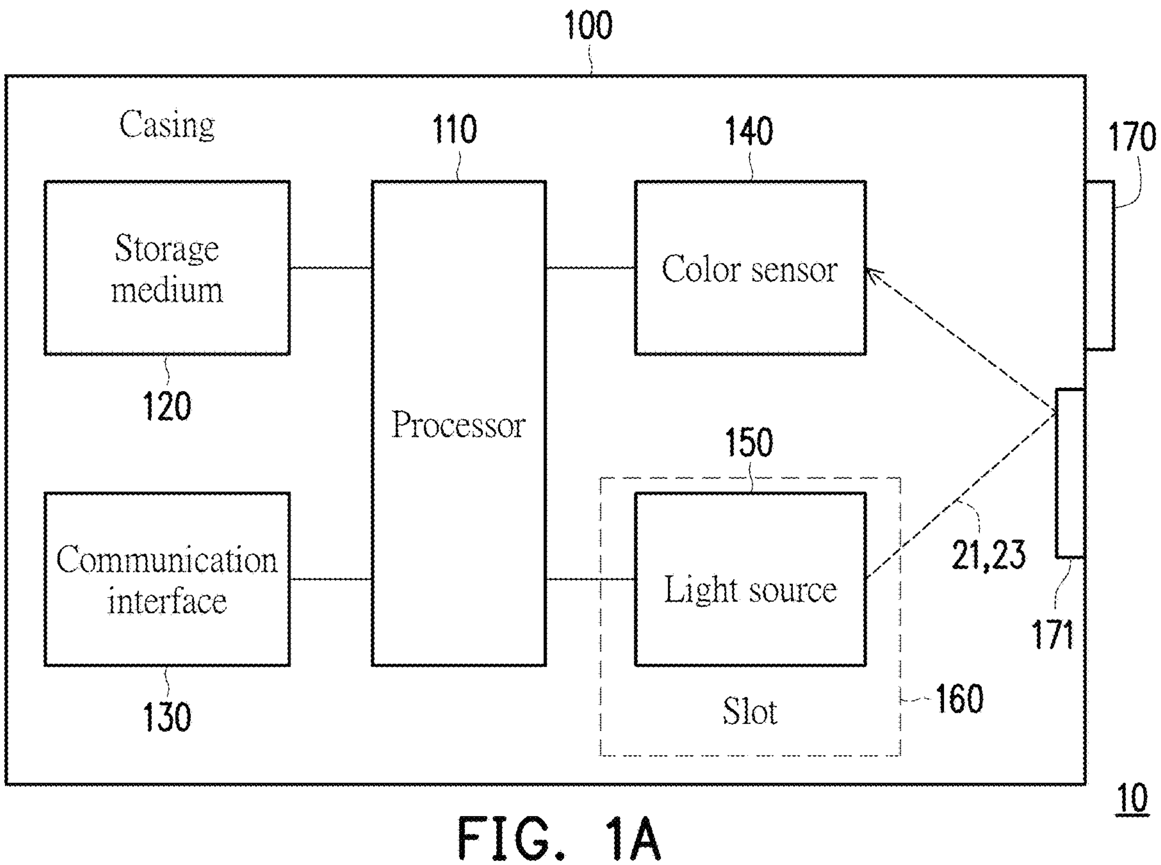
FIG. 1A and FIG. 1B are schematic diagrams of a colorimeter according to an embodiment of the disclosure.
Figure 1B:
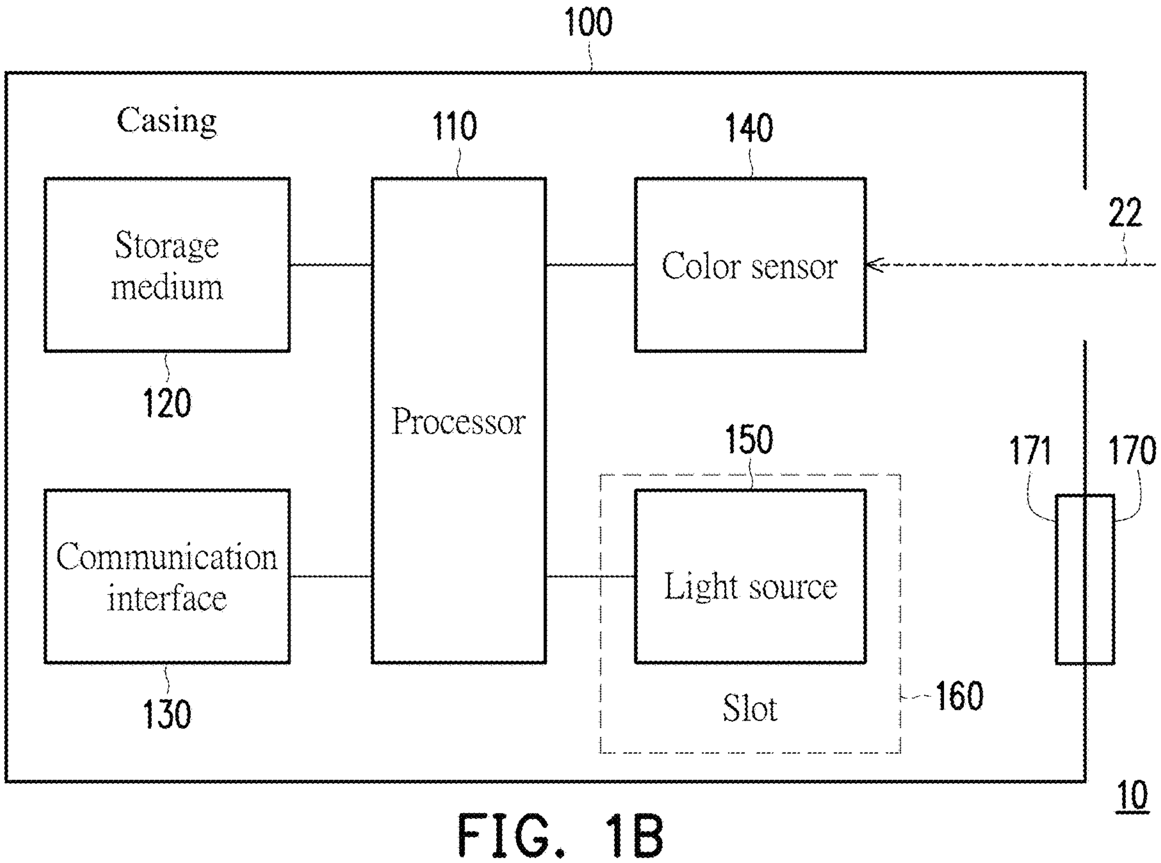

FIG. 1A and FIG. 1B are schematic diagrams of a colorimeter 10 according to an embodiment of the disclosure. The colorimeter 10 may include a casing 100 and a processor 110, a storage medium 120, a communication interface 130, a color sensor 140, and a light source 150 disposed in the casing 100. In an embodiment, the colorimeter 10 may further include a light-shielding cover 170 or an optical reflective element 171.

The processor 110 is, for example, a central processing unit (CPU) or other programmable general-purpose or special-purpose micro control units (MCUs), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar elements or a combination thereof. The processor 110 can be coupled to the storage medium 120, the communication interface 130, the color sensor 140, and the light source 150, and access and execute multiple modules and various application programs stored in the storage medium 120.

The storage medium 120 is, for example, any form of fixed or movable random access memory (RAM), a read-only memory (ROM), a flash memory, a hard disk drive (HDD), a solid state drive (SSD), or a similar element, or a combination thereof, configured to store multiple modules or various application programs that can be executed by the processor 110.

The communication interface 130 transmits or receives signals in a wireless or wired manner. The communication interface 130 may also perform operations such as low noise amplification, impedance matching, mixing, up or down frequency conversion, filtering, amplification, and similar operations. The processor 110 can communicate with an external electronic device (e.g., an external display device such as a monitor or a personal computer waiting for calibration) through the communication interface 130. In an embodiment, the communication interface 130 may include an inter-integrated circuit (I^2C) interface or a universal serial bus (USB) interface.

The color sensor 140 can measure the light beam irradiating the color sensor 140 to generate a measurement value.

The light source 150 may include a light-emitting diode. The processor 110 can control the light source 150 to provide a light beam 21 for irradiating the color sensor 140 according to the light source configuration, wherein the light source configuration includes, for example, the configuration of parameters such as hue, saturation, brightness, or RGB values. In an embodiment, the light source 150 may include a modular light source. The appearance of the modular light source may be the same as or similar to the appearance of a secure digital (SD) card or a subscriber identity module (SIM) card. In an embodiment, the casing 100 may include the slot 160. The user can place the modular light source into the casing 100 via the slot 160 or pull out the modular light source from the casing 100 via the slot 160. When the modular light source ages, the user can easily replace the old modular light source with a new modular light source, so that the calibration of the colorimeter 10 will not be affected by the aging of the light source 150.

In an embodiment, the optical reflective element 171 may be disposed in the casing 100. The optical reflective element 171 is adapted to reflect the light beam 21 provided by the light source 150 to the color sensor 140. The processor 110 can detect the reflected light beam 21 via the color sensor 140 to generate a measurement value of the light beam 21.

In an embodiment, the optical reflective element 171 is movable. The processor 110 may be coupled to a mechanism for controlling movement of the optical reflective element 171 and move the optical reflective element 171 by the mechanism. When the color sensor 140 wants to measure the light beam 21, the optical reflective element 171 can be moved by the processor 110 (or manually moved by the user) so that the optical reflective element 171 can reflect the light beam 21 from the light source 150 to the color sensor 140, as shown in FIG. 1A. When the color sensor 140 wants to measure an external light beam 22, assuming that the light source 150 is still enabled, the optical reflective element 171 can be moved by the processor 110 (or manually moved by the user) so that the optical reflective element 171 cannot reflect the light beam 21 from the light source 150 to the color sensor 140, and the light-shielding cover 170 can be opened to establish a light path between the external light beam 22 and the color sensor 140, as shown in FIG. 1B. The light-shielding cover 170 will be described in detail in other paragraphs. In other embodiments, when the color sensor 140 wants to measure the external light beam 22, the optical reflective element 171 can also be directly taken out from the casing 100. In other embodiments, when the color sensor 140 wants to measure the external light beam 22, the light source 150 can also be directly turned off.

It should be further explained that when the color sensor 140 wants to measure the light beam 21, in addition to reflecting the light beam 21 to the color sensor 140 through the optical reflective element 171, in other embodiments, the light source 150 can also directly transmit the light beam 21 to the color sensor 140. In other words, in the embodiment, the colorimeter 10 may choose not to dispose the optical reflective element 171; the embodiment will not be further drawn in the drawings.

Figure 3:
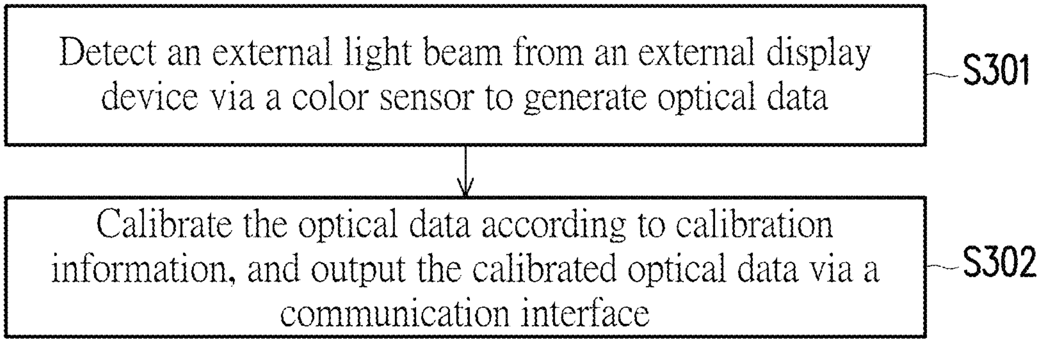
FIG. 3 is a flowchart of a second calibration function according to an embodiment of the disclosure.

The light-shielding cover 170 is adapted to block the light path between the external light beam 22 from outside the casing 100 and the color sensor 140 when the light source 150 provides the light beam 21, thereby preventing the external light beam 22 from affecting the measurement of the light beam 21 by the color sensor 140. In an embodiment, the processor 110 may be coupled to a mechanism for controlling the opening or closing of the light-shielding cover 170 and may open (without blocking the light path between the external light beam 22 and the color sensor 140) or close (blocking the light path between the external light beam 22 and the color sensor 140) the light-shielding cover 170 via the mechanism. The light-shielding cover 170 is, for example, a sliding cover disposed on the casing 100. The processor 110 may close (or the user may manually close) the light-shielding cover 170 when the light source 150 provides the light beam 21 to block the light path between the light beam 22 outside the casing 100 and the color sensor 140, as shown in FIG. 1A. The processor 110 may open (or the user may manually open) the light-shielding cover 170 when the colorimeter 10 needs to measure the external light beam 22 (for example, perform a second calibration function as shown in FIG. 3) to establish the light path between the external light beam 22 and the color sensor 140, as shown in FIG. 1B.

In an embodiment, the surface of the light-shielding cover 170 facing the color sensor 140 can be coated with a reflective layer. The reflective layer has the same function as the optical reflective element 171. That is to say, in the embodiment using the light-shielding cover 170 with the reflective layer on the surface, the optical reflective element 171 may be chosen not to be disposed; the embodiment will not be further drawn in the drawings.

The colorimeter 10 can be configured to measure the light beam from the external display device (e.g., the external light beam 22), and generate optical data for calibrating the external display device (e.g., a calibration matrix for calibrating the external display device) based on a measurement result. The external display device can receive the optical data from the communication interface 130 of the colorimeter 10 and calibrate color parameters (e.g., hue, saturation, or brightness) of the external display device according to the optical data. However, the aging of the color sensor 140 or the light source 150 of the colorimeter 10 may cause the colorimeter 10 to obtain an incorrect measurement result, thereby causing the optical data output by the colorimeter 10 to be unable to correctly calibrate the color parameters of the external display device.

Figure 2:
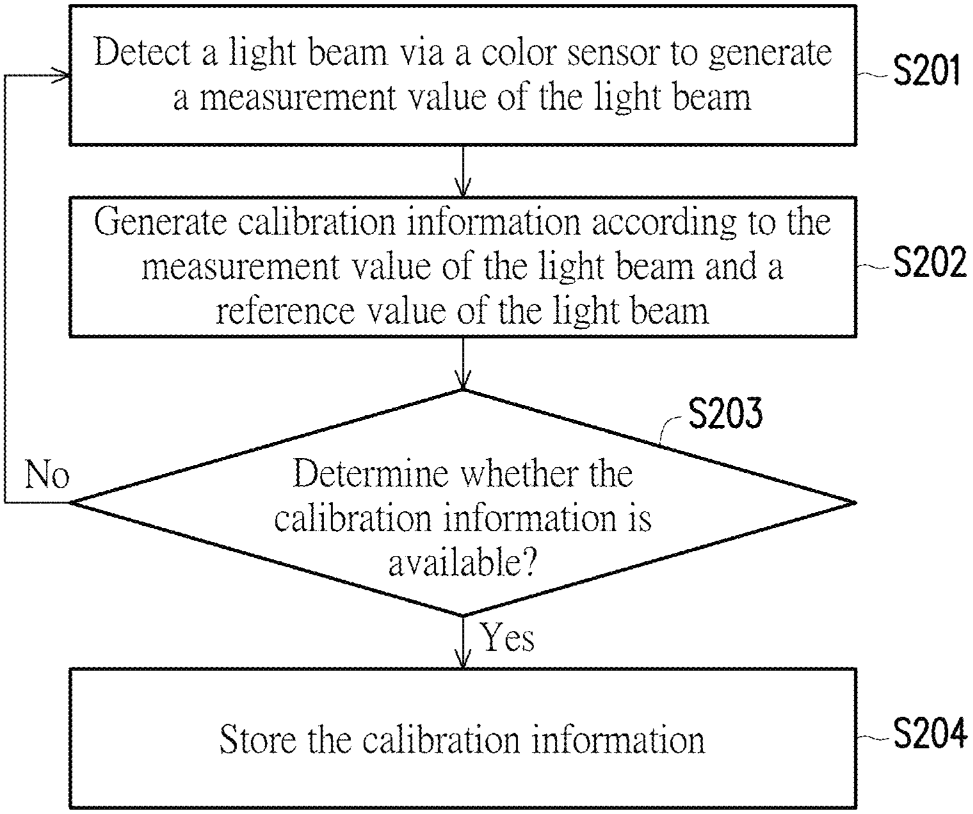
FIG. 2 is a flowchart of a first calibration function according to an embodiment of the disclosure.

In order to avoid a negative impact on the function of the colorimeter 10 due to the aging of the color sensor 140 or the light source 150, the colorimeter 10 may perform a first calibration function to improve the accuracy of the measurement of the external light beam 22 by the colorimeter 10. FIG. 2 is a flowchart of a first calibration function according to an embodiment of the disclosure.

In step S201, the processor 110 may control the light source 150 to provide the light beam 21 according to the light source configuration, wherein the light beam 21 corresponds to a specific reference value. The processor 110 can detect the light beam 21 via the color sensor 140 to generate the measurement value of the light beam 21. In step S202, the processor 110 may generate calibration information according to the measurement value of the light beam 21 and the reference value of the light beam 21, wherein the calibration information includes, for example, a calibration matrix for calibrating the colorimeter 10.

Specifically, the storage medium 120 may store one or more reference values, wherein each reference value corresponds to a specific light source configuration. For example, the storage medium 120 may store a reference value corresponding to the light source configuration of the light beam 21 (hereinafter referred to as the "first reference value"). If the light source configuration is configured to control the light source to output the light beam 21 with an RGB value of [255, 255, 255], the storage medium 120 may store a first reference value [255, 255, 255] corresponding to the RGB value of the light source configuration. If there is a difference between the measurement value (for example: [205, 254, 255]) of the light beam 21 detected by the color sensor 140 and the first reference value [255, 255, 255] in the storage medium 120 (or the difference exceeds an allowable threshold), it means that the color sensor 140 has a different measurement result than expected. Accordingly, the processor 110 can generate the calibration information according to the difference between the measurement value and the first reference value, wherein the calibration information can be configured to calibrate the measurement value, so that the calibrated measurement value matches the reference value in the storage medium 120. The processor 110 may store the calibration information in the storage medium 120.

In step S203, the processor 110 may determine whether the generated calibration information is available. If the calibration information is available, the processor 110 performs step S204. In step S204, the processor 110 may store the calibration information. On the other hand, if the calibration information is unavailable, the processor 110 may adjust the light source configuration of the light source 150 and re-perform step S201 according to the adjusted light source configuration, thereby re-performing the first calibration function. When the light source configuration of the light source 150 is adjusted, the reference value corresponding to the light beam 21 provided by the light source 150 will also be adjusted. The processor 110 may re-perform the first calibration function according to the adjusted light source configuration and the adjusted reference value.

Specifically, after obtaining the calibration information, the processor 110 can control the light source 150 to provide a light beam 23 according to the light source configuration (the same as or different from the light source configuration in step S201), wherein the storage medium 120 may store a reference value corresponding to the light source configuration of the light beam 23 (hereinafter referred to as the "second reference value"). The processor 110 can detect the light beam 23 via the color sensor 140 to generate a measurement value of the light beam 23, and calibrate the measurement value of the light beam 23 according to the calibration information. Then, the processor 110 may compare the calibrated measurement value with the second reference value to generate a calibration result, and determine whether the calibration information is available based on the calibration result. If the calibration result indicates that the difference between the calibrated measurement value and the second reference value is greater than the threshold, the processor 110 may determine that the calibration information is unavailable. If the calibration result indicates that the difference between the calibrated measurement value and the second reference value is less than or equal to the threshold, the processor 110 may determine that the calibration information is available.

For example, the processor 110 can control the light source 150 to provide the light beam 23 with an RGB value of [180, 180, 180] according to the light source configuration, and the storage medium 120 can store a second reference value [180, 180, 180, 180] corresponding to the light source configuration of the light beam 23. The processor 110 can detect the light beam 23 via the color sensor 140 to obtain the measurement value of the light beam 23, and calibrate the measurement value according to the calibration information. Then, the processor 110 may compare whether the difference between the calibrated measurement value and the second reference value [180, 180, 180] is greater than the threshold. Assume that the calibrated measurement value is [105, 180, 160], and the processor 110 determines that the difference between the calibrated measurement value [105, 180, 160] and the second reference value [180, 180, 180] is greater than the threshold, then the processor 110 may determine that the calibration information is unavailable. Assume that the calibrated measurement value is [175, 180, 178], and the processor 110 determines that the difference between the calibrated measurement value [175, 180, 178] and the second reference value [180, 180, 180] is less than or equal to the threshold, the processor 110 may determine that the calibration information is available.

After obtaining the available calibration information, the colorimeter 10 can communicatively connect to the uncalibrated external display device via the communication interface 130, and perform the second calibration function using the calibration information, wherein the second calibration function is configured to calibrate the color parameters of the external display device. FIG. 3 is a flowchart of a second calibration function according to an embodiment of the disclosure. In step S301, the processor 110 can control the external display device to provide the external light beam 22 according to the light source configuration via the communication interface 130, and can detect the external light beam 22 from the external display device via the color sensor 140 to generate the optical data, wherein the optical data is related to the measurement value of the external light beam 22 detected by the color sensor 140. In step S302, the processor 110 may calibrate the optical data according to the calibration information in the storage medium 120, and output the calibrated optical data to the external display device via the communication interface 130. The calibrated optical data includes, for example, a calibration matrix for calibrating the color parameters of the external display device.

Figure 4:
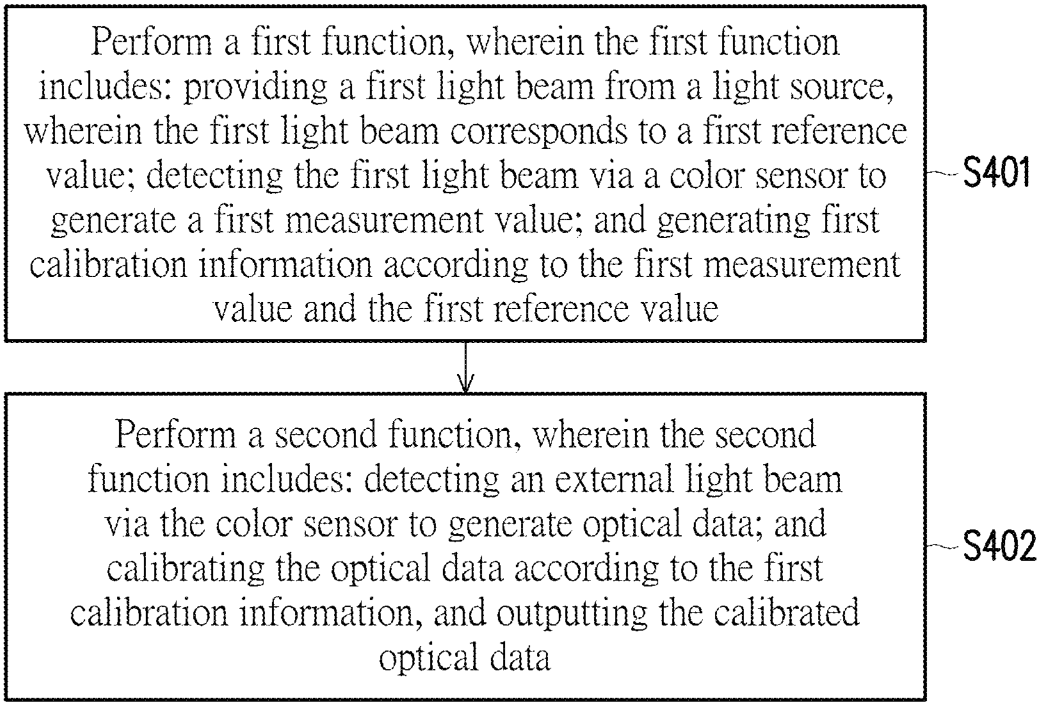
FIG. 4 is a flowchart of a control method of a colorimeter according to an embodiment of the disclosure.

FIG. 4 is a flowchart of a control method of a colorimeter according to an embodiment of the disclosure, wherein the control method can be implemented by the colorimeter 10 shown in FIG. 1A (or FIG. 1B). In step S401, the first function is performed, wherein the first function includes: providing the first light beam from the light source, wherein the first light beam corresponds to the first reference value; detecting the first light beam via the color sensor to generate the first measurement value; and generating first calibration information according to the first measurement value and the first reference value. In step S402, the second function is performed, wherein the second function includes: detecting the external light beam via the color sensor to generate the optical data; and calibrating the optical data according to the first calibration information, and outputting the calibrated optical data.

To sum up, the colorimeter of the disclosure can measure the light source disposed in the casing via the color sensor to generate the calibration information. The optical reflective element in the casing can reflect the light beam generated by the light source to the color sensor to obtain an accurate measurement result. During the generation of the calibration information, the light-shielding cover can block the light beam from the outside to prevent the external light beam from affecting the calibration result. Accordingly, the colorimeter of the disclosure can complete calibration without using an additional colorimeter.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A colorimeter, comprising:

a casing and a color sensor, a storage medium, a light source, and a processor disposed in the casing, wherein the processor is coupled to the color sensor, the storage medium, and the light source, the storage medium stores a first reference value, the processor is configured to perform a first calibration function, the first calibration function comprising:

providing a first light beam from the light source, wherein the first light beam corresponds to the first reference value;

detecting the first light beam via the color sensor to generate a first measurement value; and generating first calibration information according to the first measurement value and the first reference value; and the processor is configured to perform a second calibration function, the second calibration function comprising:

detecting an external light beam via the color sensor to generate optical data; and calibrating the optical data according to the first calibration information, and outputting the calibrated optical data.

2. The colorimeter according to claim 1, further comprising:

an optical reflective element, disposed in the casing, and adapted to reflect the first light beam, wherein the processor is configured to:

detect the reflected first light beam via the color sensor to generate the first measurement value.

3. The colorimeter according to claim 1, further comprising:

a light-shielding cover, adapted to block a light path between a light beam from outside the casing and the color sensor when the light source provides the first light beam.

4. The colorimeter according to claim 1, wherein the storage medium further stores a second reference value, and the processor is further configured to perform the first calibration function, the first calibration function further comprising:

providing a second light beam from the light source, wherein the second light beam corresponds to the second reference value;

detecting the second light beam via the color sensor to generate a second measurement value;

calibrating the second measurement value according to the first calibration information;

comparing the calibrated second measurement value and the second reference value to generate a calibration result, and determining whether the first calibration information is available according to the calibration result; and in response to determining that the first calibration information is available, performing the second calibration function by the processor.

5. The colorimeter according to claim 4, wherein in response to the processor determining that the first calibration information is unavailable, the processor is configured to adjust the first reference value according to the calibration result, and re-perform the first calibration function by the adjusted first reference value.

6. The colorimeter according to claim 1, wherein the light source is a modular light source.

7. The colorimeter according to claim 6, wherein the casing comprises:

a slot, adapted to place the modular light source into the casing via the slot or pull out the modular light source from the casing via the slot.

8. The colorimeter according to claim 1, further comprising:

a communication interface, coupled to the processor, wherein the processor is further configured to:

communicatively connect via the communication interface to an external display device providing the external light beam; and calibrate color parameters of the external display device according to the calibrated optical data.

9. The colorimeter according to claim 8, wherein the communication interface comprises one of the following: an inter-integrated circuit interface or a universal serial bus interface.

10. The colorimeter according to claim 1, wherein the light source comprises a light-emitting diode.

11. A control method of a colorimeter, wherein the colorimeter comprises a casing and a color sensor, and a light source disposed in the casing, the control method comprising:

performing a first calibration function, wherein the first calibration function comprises:

providing a first light beam from the light source, wherein the first light beam corresponds to a first reference value;

detecting the first light beam via the color sensor to generate a first measurement value; and generating first calibration information according to the first measurement value and the first reference value; and performing a second calibration function, wherein the second calibration function comprises:

detecting an external light beam via the color sensor to generate optical data; and calibrating the optical data according to the first calibration information, and outputting the calibrated optical data.

12. The control method according to claim 11, wherein the colorimeter further comprises an optical reflective element disposed in the casing, and the step of detecting the first light beam via the color sensor to generate the first measurement value comprises:

reflecting the first light beam by the optical reflective element; and detecting the reflected first light beam via the color sensor to generate the first measurement value.

13. The control method according to claim 11, wherein the colorimeter further comprises a light-shielding cover, and the light-shielding cover is adapted to block a light path between a light beam from outside the casing and the color sensor when the light source provides the first light beam.

14. The control method according to claim 11, wherein the first calibration function further comprises:

providing a second light beam from the light source, wherein the second light beam corresponds to a second reference value;

detecting the second light beam via the color sensor to generate a second measurement value;

calibrating the second measurement value according to the first calibration information;

comparing the calibrated second measurement value and the second reference value to generate a calibration result, and determining whether the first calibration information is available according to the calibration result; and in response to determining that the first calibration information is available, performing the second calibration function.

15. The control method according to claim 14, wherein the first calibration function further comprises:

in response to determining that the first calibration function is unavailable, adjusting the first reference value according to the calibration result, and re-performing the first calibration function using the adjusted first reference value.

16. The control method according to claim 11, wherein the light source is a modular light source.

17. The control method according to claim 16, wherein the casing comprises:

a slot, adapted to place the modular light source into the casing via the slot or pull out the modular light source from the casing via the slot.

18. The control method according to claim 11, wherein the colorimeter further comprises a communication interface, and the control method further comprises:

communicatively connecting via the communication interface to an external display device providing the external light beam; and calibrating color parameters of the external display device according to the calibrated optical data.

* * * * *